(12) United States Patent
Robertson

(10) Patent No.: US 11,685,651 B2
(45) Date of Patent: Jun. 27, 2023

(54) CATALYTIC DECOMPOSITION OF HYDROCARBONS FOR THE PRODUCTION OF HYDROGEN AND CARBON

(71) Applicant: Mark Kevin Robertson, Longmont, CO (US)

(72) Inventor: Mark Kevin Robertson, Longmont, CO (US)

( * ) Notice: Subject to any disclaimer, the term of this patent is extended or adjusted under 35 U.S.C. 154(b) by 285 days.

(21) Appl. No.: 17/078,914

(22) Filed: Oct. 23, 2020

(65) Prior Publication Data

US 2021/0122629 A1  Apr. 29, 2021

Related U.S. Application Data

(60) Provisional application No. 62/973,841, filed on Oct. 25, 2019.

(51) Int. Cl.
*D01F 9/127* (2006.01)
*C01B 3/26* (2006.01)
(Continued)

(52) U.S. Cl.
CPC ............ *C01B 3/26* (2013.01); *B01J 8/1836* (2013.01); *B01J 8/1872* (2013.01); *B01J 8/34* (2013.01);
(Continued)

(58) Field of Classification Search
CPC ............ C01B 3/30; C01B 2203/1058; C01B 2203/041; C01B 2203/042; C01B 3/26; C01B 2203/1047; C01B 2203/1052; B01J 8/34; B01J 2208/00115; B01J 2208/0069; B01J 21/04; B01J 8/1827; B01J 35/023;
(Continued)

(56) References Cited

U.S. PATENT DOCUMENTS 2,937,989 A * 5/1960 Huntley .................... B01J 8/26
208/162
3,284,161 A 11/1966 Pohlenz
(Continued)

FOREIGN PATENT DOCUMENTS

CN  106 283 272 A * 1/2017 ............. B01J 23/04
CN  111 167 460 A * 5/2020 ............. B01J 37/031
(Continued)

OTHER PUBLICATIONS

Ammendola, "Some Issues in Modelling Methane Catalytic Decomposition in Fluidized Bed Reactors", International Journal oF Hydrogen Energy 33 (2008) 2679-2694.
(Continued)

*Primary Examiner* — Timothy C Vanoy

(57) ABSTRACT

A new process for the decomposition of hydrocarbon feed stream(s) that achieves the conversion of a hydrocarbon feed stream to hydrogen and filamentous carbon, with minimal resulting production of carbon oxides is described herein. In this invention it is proposed to achieve the hydrocarbon conversion by the use of dual fluidized bed reaction zones, fluidly connected, for (i). hydrocarbon reaction (the reactor) and (ii). catalyst regeneration and heating (the regenerator) and to use a transition metal supported catalyst to achieve high hydrocarbon conversion and to produce high quality filamentous carbon.

23 Claims, 3 Drawing Sheets

(51) Int. Cl.
*B01J 8/34* (2006.01)
*B01J 8/18* (2006.01)
*B01J 23/78* (2006.01)

(52) U.S. Cl.
CPC .............. *B01J 23/78* (2013.01); *D01F 9/127* (2013.01); *B01J 2208/00115* (2013.01)

(58) Field of Classification Search
CPC .. B01J 2208/0015; B01J 8/009; B01J 8/1836; B01J 8/42; B01J 2208/00557; B01J 23/78; B01J 23/70; B01J 8/26; B01J 8/1872; B01J 8/46; B01J 35/0013; D01E 9/127; Y02P 20/584
See application file for complete search history.

(56) References Cited

U.S. PATENT DOCUMENTS

| | | | |
|---|---|---|---|
| 3,340,011 | A | 9/1967 | Hoekstra |
| 3,340,012 | A | 9/1967 | Moehl |
| 6,995,115 | B2 | 2/2006 | Wang |
| 7,001,586 | B2 | 2/2006 | Wang |
| 7,157,167 | B1 | 1/2007 | Muradov |
| 7,470,647 | B2 | 12/2008 | Cai |
| 7,767,182 | B2 | 8/2010 | Tada |
| 7,915,196 | B2 | 3/2011 | Parent |
| 8,663,504 | B2 | 3/2014 | Kim |
| 9,528,057 | B2 | 12/2016 | Apanel |
| 9,567,219 | B2 | 1/2017 | Denton |
| 10,207,922 | B2 | 2/2019 | Stiller |
| 10,421,061 | B2 | 9/2019 | Zhang |
| 10,457,554 | B2 | 10/2019 | Basset |
| 10,633,249 | B2 * | 4/2020 | Noda ..................... B82Y 30/00 |
| 2002/0007594 | A1 * | 1/2002 | Muradov ............. B01J 19/2475 48/78 |
| 2004/0253168 | A1 | 12/2004 | Chu |
| 2005/0065024 | A1 * | 3/2005 | Wang .................... B01J 23/002 502/328 |
| 2016/0167963 | A1 * | 6/2016 | Kobayashi ............. B01J 23/898 429/425 |

FOREIGN PATENT DOCUMENTS

| | | | | |
|---|---|---|---|---|
| CN | 113 135 562 A | * | 7/2021 | .............. C01B 3/26 |
| KR | 2007 023 265 A | * | 2/2007 | .............. B01J 23/04 |
| WO | WO 99 043 609 A1 | * | 9/1999 | .............. C01B 3/26 |
| WO | WO2006040788 A1 | | 4/2006 | |
| WO | WO 2014 188 439 A1 | * | 11/2014 | .............. B01J 37/02 |
| WO | WO 2015 101 917 A1 | * | 7/2015 | .............. C01B 31/02 |
| WO | WO2016154666 A1 | | 10/2016 | |

OTHER PUBLICATIONS

Amin, "Modeling and Experimental Study of Methane Catalytic Cracking as a Hydrogen Production Technology", 2001, Thesis (University of Waterloo).

Abanades, "Natural Gas Decarbonization as Tool for Greenhouse Gases Emission Control", Jun. 19, 2019, Frontiers in Energy Research.

Muradov, "Decentralized production of hydrogen from hydrocarbons with reduced CO2 emission", Jun. 13-16, 2006, WHEC 16—Lyon France.

Abanades, "Methane cracking as a bridge technology to the hydrogen economy", International journal of hydrogen energy 42 (2017) 720-731.

Srilatha, "Sustainable Fuel production by TCD of Methane—A Review", SA Journal of Chemical Engineering, 24 (2017), 156-167.

Fakeeha, "Hydrogen production via catalytic methane decomposition over alumina supported iron catalyst", Arabian Journal of Chemistry (2018) 11, 405-414.

Tae Jang, "Hydrogen production by the thermocatalytic decomposition of methane in a fluidized bed reactor", Korean J. Chem. Eng., 24(2), 374-377 (2007).

Shukrullah, "Mass Production of CNT using Fluidized Bed Reactor—A Short Review", Trends in Applied Sciences Research 9 (3): 121-131, 2014.

Torres, "Hydrogen production by catalytic decomposition of methane using a Fe-based catalyst in a fluidized bed reactor", Journal of Natural Gas Chemistry • Jul. 2012.

Koc, "Partial Regeneration of Ni-Based Catalysts for Hydrogen Production via Methane Cracking", Turk J Chem 32 (2008), 157-168.

McDermott, "Methane Pyrolysis for Base-Grown Carbon Nanotubes and CO2-free H2 over Transition Metal Catalysts", DOE H2 and Fuel Cells Program, h2045, Apr. 2019.

Mayer, "Dual Fluidized Bed Reforming Pilot Test Results and Potential Commercial Implications", AIChE Annual Meeting 2010. Salt Lake City.

Magrini-Bair, "Fluidizable Reforming Catalyst Development for Conditioning Biomass Derived Syngas", AIChE Annual Meeting 2010. Salt Lake City.

* cited by examiner

CATALYTIC DECOMPOSITION OF HYDROCARBONS FOR THE PRODUCTION OF HYDROGEN AND CARBON

CROSS-REFERENCE TO RELATED APPLICATIONS

"Catalytic Decomposition of Hydrocarbons for the Production of Hydrogen and Carbon", U.S. Provisional Pat. Ser. No. 62/973,841, filed Oct. 25, 2019. The present application claims priority to this earlier filed provisional application and hereby incorporates subject matter of the provisional application in its entirety.

STATEMENT REGARDING FEDERALLY SPONSORED RESEARCH OR DEVELOPMENT

Not applicable

BACKGROUND OF THE INVENTION

Field of the Invention

This invention relates generally to the field of catalytic thermal decomposition of hydrocarbons. More specifically, the invention relates to a process for the conversion of hydrocarbons to hydrogen and filamentous carbon, with minimal resulting production of carbon oxides.

Background of the Invention

Combustion of hydrocarbons for energy production results in the generation of carbon dioxide, which is typically emitted to the atmosphere. Carbon dioxide has been identified as the most significant greenhouse gas and as such emissions of carbon dioxide contribute significantly to the global warming phenomena currently being experienced.

Technologies currently exist for the capture of carbon dioxide that would otherwise be emitted from hydrocarbon combustion but these technologies are expensive and the carbon dioxide recovered must be sequestered under the ground in deep geological formations, which are not available at many locations, which may require long pipelines to transport the carbon dioxide to a suitable site and the long term ability of the carbon dioxide to remain sequester underground has not been adequately demonstrated to date.

An alternative method of conversion of hydrocarbon feedstocks into a useful fuel that can be combusted without any carbon dioxide emissions and a useful carbon byproduct stream that effectively sequesters the carbon is the thermal decomposition of hydrocarbon feedstocks into hydrogen and carbon. For a methane feedstock the reaction stoichiometry is represented as follows:

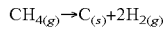

$$CH_{4(g)} \rightarrow C_{(s)} + 2H_{2(g)}$$

Non-catalytic thermal decomposition processes require very high temperatures and produces less valuable carbon products. Catalytic thermal decomposition processes require significantly lower operating temperatures and hence are significantly more energetically efficient and produce more valuable carbon products including filamentous carbon products such as carbon nanotubes (CNTs). Adjustment of catalyst properties such as the catalyst metal crystallite size allow the properties of the CNTs, such as their diameter, to be controlled.

Technical issues that have prevented catalytic thermal decomposition technologies from being commercially deployed to date include the rapid deactivation of the catalysts due to the encapsulation of the catalyst active metal sites in carbon and the inability to regenerate the catalyst without experiencing catalyst deactivation over an extended time period. In addition, it is desirable to regenerate the catalyst and provide the necessary heat required for the endothermic decomposition reaction(s) without the generation of significant additional carbon dioxide emissions, such as would be expected if a significant portion of the heat required is generated by combustion of the carbon layed down on the catalyst surface and/or by combustion of hydrocarbon fuels.

Most catalysts employed for catalytic thermal decompositions employ an active metal supported on a porous substrate, such as a porous alumina or silica. These porous catalyst supports provide high surface areas required for provision of a high number of active metal sites, which results in an active catalyst and resultant initial high hydrocarbon conversions. These porous supports have many times more active surface area within the pores of the catalyst than on the exterior surface of the catalyst particles and as a result there is no opportunity for the carbon layed down within the pores to be attrited off of the catalyst particles within a fluidized bed of catalyst particles. Hence the only way to remove the carbon from the catalyst, and hence to regenerate the catalyst, is to burn the carbon off of the catalyst, which results in high carbon dioxide emissions. A means of achieving an active catalyst, with sufficient active metal sites, using a non-porous substrate, which allows for the majority of the produced carbon to be attrited off of the catalyst particle exterior surfaces, is required.

A common mechanism for the production of CNTs involves the diffusion of carbon through the supported active metal particle and CNT growth between the support and the active metal, which results in the lifting off of the active metal particles off of the catalyst support. This results in loss of catalyst activity over time and also contaminates the carbon product with the active metal particles, which may in some cases be toxic or otherwise a quality issue for the carbon end-use application. A catalyst formulation which results in high metal to support interaction and hence allows for the production of CNTs without the loss of active metal sites and contamination of the carbon product is required.

Catalyst regeneration requires the removal of encapsulating carbon from the metal sites via gasification or combustion. If the regeneration procedure results in sintering or agglomeration of the metal site or formation of inactive catalytic metal species, the catalyst will not be able to maintain its activity over extended periods. A catalyst regeneration process that prevents or eliminates these unwanted reactions is required.

To achieve sufficiently high catalyst surface areas and numbers of active metal sites, for a non-porous catalyst substrate, very small catalyst particle size is required. Such small particles are classified as Geldart group C (Cohesive) particulates which, in general, are difficult to fluidize. Geldart group C particles are typically less than 40 micron in diameter but may be significantly smaller in diameter including in the case of Nano powders (See FIG. 3). Several techniques can be applied to assist in the fluidization of Geldart group C particulates including mechanical vibration, mechanical stirring, sonication, ultrasonication, pulsed gas flow, electrical fields, magnetic fields, particle mixing, addition of fluidization aids and microjet flows.

Filamentous carbon is attached to the catalyst particles but is not mechanically as strong as the catalyst support itself, so carbon filaments formed on catalyst particle surfaces are attrited off of the particles relatively easily, primarily as a result of the particle to particle contact and mechanical abrasion within the a fluidized bed reactor. Particle to particle contact results from high solids circulation rates within the bed, which itself is generated by gas injection and bubble rise in the bed, as well as particle acceleration closer to the gas injection locations.

Fine Geldart group C catalyst particles result in high catalyst particle external area which significantly improves the rate of attrition and elutriation of carbon from fluidized bed reactors, for a given bed fluidization velocity, which allows the bed to operate at lower steady state carbon on catalyst content and hence to maintain higher average catalyst activity. The rate of carbon attrition and elutriation is also proportional to the difference between the bed superficial velocity and minimum fluidization velocity, so the bed superficial velocity can be selected to achieved a desired degree of carbon attrition, such that the majority of the carbon formed from the hydrocarbon decomposition reaction is recovered from the reactor effluent gas stream and does not pass to the catalyst regenerator, where combustion of the residual carbon left on the catalyst will result in the generation of carbon oxides.

Very fine Geldart group C particles tend to form into agglomerates, of an allowable steady state size dictated by the fluidization conditions, due to the action of van der Waals, electrostatic, capillary and interlocking forces. This actually helps in achieving fluidization of Geldart Group C particulates. These agglomerates can also be broken apart, or deagglomerated, by appropriate design of gas grids and or secondary gas jets in the fluidized bed. The deagglomerated fines will tend to reform new agglomerates in the bulk of fluidized bed, away from the gas injection points.

The mechanisms of particle to particle contact within the fluidized bed, fine particle agglomeration in the bulk of the bed, deagglomeration closer to the gas injection grid and at secondary gas injection locations and solids circulation within the bed provides a means to fluidize very fine catalyst particles, achieve high catalyst surface areas for non-porous catalyst substrates and to achieve high extents for recovery of attrited carbon from the catalyst surfaces.

Fluidization of fine Geldart group C particulates can also result in high entrainment rates for elutriated catalyst particles. Suitable design of conventional particulate separation devices and the application of additional separation techniques such as the use of magnetic separation can minimize catalyst losses.

Consequently there is a need for a catalytic thermal decomposition technology that is able to achieve high hydrocarbon conversions, while achieving and maintaining an active catalyst for extended periods, producing a suitable quality filamentous carbon product, minimizing catalyst losses, maximizing carbon recovery and which does not produce the majority of the heat required to support the endothermic decomposition reaction(s) by either combusting carbon or hydrocarbon fuels.

BRIEF SUMMARY

A new process for the decomposition of hydrocarbon feed stream(s) that achieves the conversion of a hydrocarbon feed stream to hydrogen and filamentous carbon, with minimal resulting production of carbon oxides is described herein. In this invention it is proposed to achieve the hydrocarbon conversion by the use of dual fluidized bed reaction zones, fluidly connected, for (i). hydrocarbon reaction (the reactor) and (ii). catalyst regeneration and heating (the regenerator) and to use a transition metal supported catalyst to achieve high hydrocarbon conversion and to produce high quality filamentous carbon.

A novel aspect of the disclosed process involves the use of supported transition metal, substantially non-porous, catalyst particles, in order to minimize or eliminate carbon formation in internal catalyst pores, that is not available to be elutriated out of the first reaction zone via mechanical abrasion in the fluidized bed. An acceptable number of catalyst active metal sites and an increased catalyst external surface area for carbon mechanical abrasion is provided by using very small catalyst particles, generally classified as Geldart group C (Cohesive) particulates.

A novel aspect of the disclosed process involves the design of gas distributor holes, nozzles or tuyeres in the first reaction zone so as to purposely break up catalyst agglomerates, while not resulting in excessive catalyst particle abrasion, and to expose more carbon to mechanical abrasion, elutriation and recovery thereby minimizing the amount of carbon that is sent with the catalyst to the second reaction zone (the regenerator), where it would otherwise be combusted, thus contributing to carbon oxide emissions from the process.

In an embodiment, a catalyst utilizing nickel as an active metal, a low active metal loading, a magnesium promoter and an attrition resistant alpha alumina support is described which provides for high metal-support interaction, which reduces catalyst deactivation rate and reduces nickel contamination in the recovered filamentous carbon product. A low active metal loading also disperses the metal over the support and prevents metal site migration, which can result in agglomeration and sintering at the metal sites. A novel aspect of the catalyst regeneration is the prescription for a low excess oxygen environment for the catalyst regeneration, a low regeneration catalyst residence time and a desirable range of catalyst regeneration temperature in order to regenerate the catalyst without experiencing catalyst deactivation over an extended operating period.

In an embodiment, spent catalyst being transferred from the first reaction zone to the second reaction zone undergoes an additional processing step consisting of additional carbon attrition and residual hydrocarbon stripping, prior to the catalyst entering the second reaction zone, in order to further reduce the carbon oxide emissions for the process.

The foregoing has outlined rather broadly the features and technical advantages of the invention in order that the detailed description of the invention that follows may be better understood. Additional features and advantages of the invention will be described hereinafter that form the subject of the claims of the invention. It should be appreciated by those skilled in the art that the conception and the specific embodiments disclosed may be readily utilized as a basis for modifying or designing other processes for carrying out the same purposes of the invention. It should also be realized by those skilled in the art that such equivalent processes do not depart from the spirit and scope of the invention as set forth in the appended claims.

BRIEF DESCRIPTION OF THE DRAWINGS

For a detailed description of the preferred embodiments of the invention, reference will now be made to the accompanying drawings in which.

NOTATION AND NOMENCLATURE

Certain terms are used throughout the following description and claims to refer to particular system components. This document does not intend to distinguish between components that differ in name but not function. In the following discussion and in the claims, the terms "including" and "comprising" are used in an open-ended fashion, and thus should be interpreted to mean "including, but not limited to . . . ".

As used herein, Nano powders refers to catalyst particles with a diameter less than 100 nanometers (nm).

As used herein, hydrocarbons refers to methane, biogases, digester off gases, landfill gases, coal bed methane, pipeline natural gases, natural gases with residual light hydrocarbon liquids and other methane rich process streams.

As used herein, filamentous carbon refers to carbon nanofibers, single walled and multiwalled carbon nanotubes. Carbon nanotubes (CNTs) consist of cylindrical tubes formed from graphene with diameters in the nanometer range.

DETAILED DESCRIPTION OF THE PREFERRED EMBODIMENTS

Figure 1:
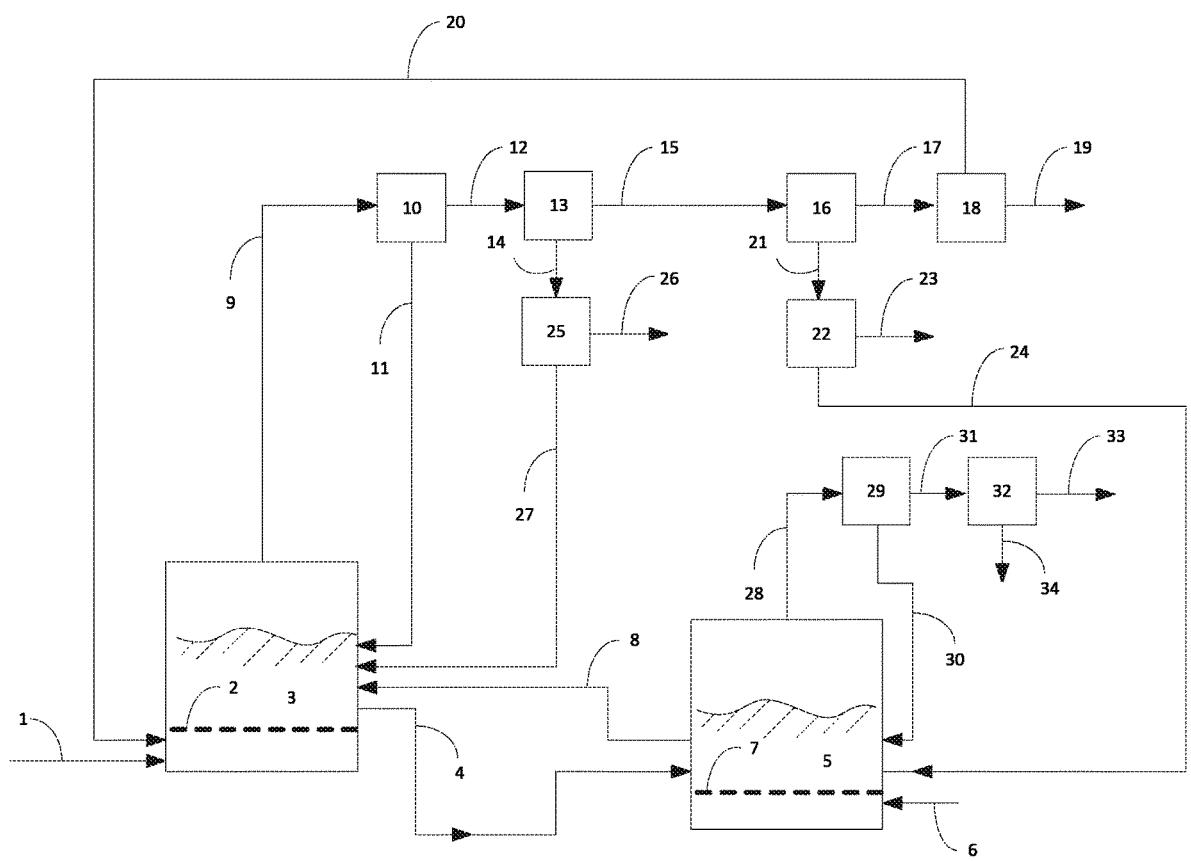
FIG. 1 is a block flow diagram of the process according to an embodiment of the present disclosure.

FIG. 1 illustrates the block flow diagram for the catalytic thermal decomposition of a hydrocarbon stream. The hydrocarbon feedstock 1 is fed to the first reaction zone (the reactor) fluidized bed 3 via a gas distributor 2. The distributed feed gas fluidizes the solid catalyst in the first reactor zone, thereby providing an environment for rapid hydrocarbon decomposition reaction(s), good heat transfer and mixing, removal of filamentous carbon from the catalyst external surface via mechanical abrasion and catalyst transport.

In embodiments, the first reaction zone temperature is between 1250 and 1650° F., for the described process, with iron (Fe) as a catalyst active metal and between 800 and 1500° F., preferably between 900 to 1300° F., for the described process, with nickel (Ni) as a catalyst active metal.

In embodiments, the first reaction zone pressure is between 1 atmosphere (absolute) and 5 atmospheres (absolute), preferably between 1 atmosphere (absolute) and 3 atmospheres (absolute).

In embodiments, the catalyst comprises nickel as active metal, magnesium as a promoter and alpha alumina as a support. In some embodiments the nickel oxide content of the catalyst is less than 10 wt %, and the molar ratio of nickel to magnesium is less than 3 to 1, whereby the low active metal loading and the presence of the magnesium promoter result in high metal-support interaction which reduces the catalyst deactivation rate and reduces nickel contamination in the recovered filamentous carbon product.

In embodiments, the average ($d_{50}$) catalyst particle size is between 40 nanometers (nm) and 40 microns, alternately between 400 nm and 4 microns, alternately between 0.5 and 2 microns.

In embodiments, the catalyst support porosity is less than 1%, alternately less than 0.5%, alternately less than 0.2%.

In embodiments, the first fluidized bed reactor (the reactor) superficial velocity is between 3 ft/s and 3 times the minimum fluidization velocity, with the superficial velocity chosen to find a suitable balance between the required carbon attrition rate from the catalyst external surface and the desire to minimize catalyst fines elutriation from the fluidized bed. Fluidization of the nano- and micron-sized catalyst particles and agglomerates in the first reaction zone may be enhanced by fluidization enhancement techniques selected from the group mechanical vibration, mechanical stirring, sonication, ultrasonication, pulsed gas flow, electrical fields, magnetic fields, particle mixing, addition of fluidization aids and microjet flows.

In embodiments, the hydrocarbon feed gas is introduced into the first reaction zone (the reactor) fluidized bed, via one or more gas distributor plates, pipes and/or tuyeres. The hole size and gas jet velocity are chosen at these gas injection points in order to facilitate the breakup of catalyst particle fines agglomerates without generating unacceptably high catalyst particle attrition rates. The breakup of the catalyst fines agglomerates, close to these gas injection points makes the filamentous carbon layed down on catalyst particles within the agglomerates available to be attrited off of the catalyst surfaces due to particle to particle contact and mechanical abrasion within the bed around the gas injection zones. A typical gas injection point jet velocity is between 100 ft/s and 300 ft/s, more preferably between 150 ft/s and 200 ft/s.

In embodiments, additional heat can be provided to the first reaction zone by inclusion of heating surfaces imbedded in the first reaction zone fluidized bed.

In embodiments, additional air, enriched air and/or oxygen may be injected into the first reaction zone fluidized bed, resulting in partial oxidation of some portion of the hydrocarbon feedstock, hydrogen product or carbon byproduct, thereby supplementing some portion of the required heat transfer to the first reaction zone otherwise provided by return of heated and regenerated catalyst from the second reaction zone (the regenerator) or by the heating surfaces embedded in the first reaction zone fluidized bed.

In embodiments, one or more hydrogen permeable membrane element(s) may be installed in the first reaction zone fluidized bed in order to selectively permeate hydrogen from the reactor and shift the reaction equilibrium towards increased hydrocarbon conversion.

Spent catalyst 4, with residual carbon on the catalyst surface, is transferred from the first reaction zone 3 to the second reaction zone (the regenerator) fluidized bed 5. Fluidization of the nano- and micron-sized catalyst particles and agglomerates in the second reaction zone may be enhanced by fluidization enhancement techniques selected from the group mechanical vibration, mechanical stirring, sonication, ultrasonication, pulsed gas flow, electrical fields, magnetic fields, particle mixing, addition of fluidization aids and microjet flows.

The rate of catalyst circulation between the first and second reaction zone is controlled to achieve an acceptable catalyst activity in the first reaction zone, to limit catalyst residence time in the second reaction zone (the regenerator) and to provide the heat necessary to the first reaction zone, due to the endothermic hydrocarbon decomposition reaction(s), via return of heated and regenerated catalyst 8 from the second reaction zone to the first reaction zone. The mass ratio of catalyst circulation to hydrocarbon feed gas flowrate is typically between 8 to 25, alternately between 12 and 18.

An oxidant 6 is fed to the second reaction zone (the regenerator) fluidized bed 5 via a gas distributor 7. The oxidant is selected from a group comprising: air, enriched air and oxygen. The distributed oxidant fluidizes the solid catalyst in the second reactor, thereby providing an environment for rapid oxidation reaction(s), good heat transfer and mixing.

The temperature in the second reaction zone is controlled independently from the temperature in the first reaction zone, by controls comprising primarily of: control of oxidant flow to the second reaction zone; fuel flow control to the second reaction zone and oxidant stream preheat temperature control. The second reaction zone temperature is controlled between 1600 to 1750° F., alternately between 1650 and 1700° F. The oxygen content of the second reaction zone exiting flue gas stream 28 is controlled at low values in order to prevent over-oxidation of the catalyst, potentially resulting in aluminate formation, which cannot be readily reduced in the first reaction zone and hence results in catalyst deactivation. The oxygen content of the second reaction zone exiting flue gas should be controlled at less than 2 vol % $O_2$ (dry), preferably less than 1 vol % $O_2$ (dry) and more preferably less than 0.5 vol % $O_2$ (dry). The catalyst residence time in the second reaction zone is also limited in order to reduce the chance of over-oxidation of the catalyst. The catalyst residence time in the second reaction zone is limited to 3 minutes (max), alternately 2 minutes (max) and alternately 1 minute (max).

Effluent gas from the first reaction zone 9, containing unconverted hydrocarbons, product hydrogen, elutriated carbon and catalyst fines is routed to a first solid separator 10, which is configured to maximize recovery of catalyst fines. Solids recovered from this device 11 is returned to the first reaction zone fluidized bed 3. The solid separation device can be selected from the group gravity separator, cyclone, electrostatic separator, filter or wet scrubber. In embodiments, imposition of a magnetic field(s) may be utilized to polarize catalyst particles and result in catalyst particle agglomeration resulting in enhanced solids separation from the effluent gases leaving the first reaction zones.

Effluent gas exiting to the first solid separator 12 is routed to a second solid separator 13, which is configured to maximize recovery of entrained carbon. The solid separation device can be selected from the group gravity separator, cyclone, electrostatic separator, filter or wet scrubber.

Solids recovered from this device 14 is routed to a separator 25 configured to separate catalyst 27 from the recovered solids, with the recovered catalyst being returned to the first reaction zone fluidized bed 3 and the byproduct carbon 26 being available for sale. Magnetic separation techniques can be employed as one potential separation technique.

Effluent gas exiting the second solid separator 15 is routed to a gas separator 16, where the hydrogen product 21 is separated from the unreacted hydrocarbon 17. The hydrogen separation device can be selected from the group membrane separator and adsorption process. The total hydrogen product 21 is routed to a gas splitter 22, where a small portion of the hydrogen 24 is sent to the second reaction zone 5, to be combusted as a zero carbon oxide emitting fuel as required by the system heat balance, and the balance of the hydrogen 23 is available for use as a fuel or chemical intermediate for sale.

The unreacted hydrocarbon stream 17 is routed to a gas splitter 18, where unreacted hydrocarbon may be recycled to the first reaction zone 20 or purged from the system 19.

The effluent gas stream from the second reaction zone 28, containing flue gas and elutriated catalyst fines, is routed to a first solid separator 29, which is configured to recover catalyst fines and return the recovered solids to the second reaction zone fluidized bed 30. In embodiments, imposition of a magnetic field(s) may be utilized to polarize catalyst particles and result in catalyst particle agglomeration resulting in enhanced solids separation from the effluent gases leaving the second reaction zone.

Flue gas from the first solid separator 31 is routed to a second solid separator 32, where additional fines 34 are recovered before flue gas 33 is routed to the atmosphere, possibly after any additional required emission controls.

Figure 2:
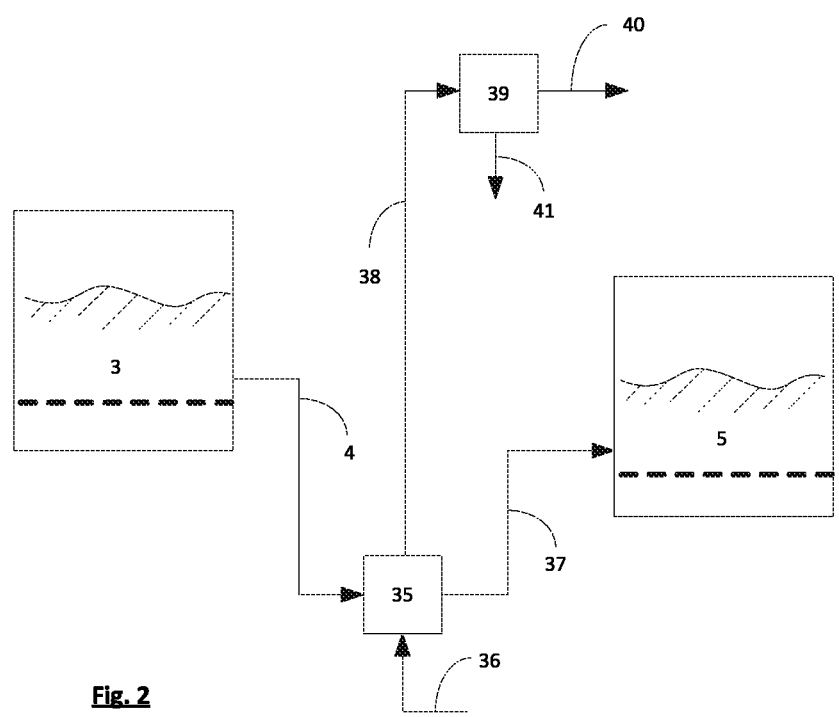
FIG. 2 is a block flow diagram of the additional carbon attrition and hydrocarbon stripping step the catalyst being transferred to the second reaction zone (the regenerator) undergoes in an embodiment of the present disclosure.

FIG. 2 is a block flow diagram of the additional carbon attrition and hydrocarbon stripping step the catalyst being transferred from the first reaction zone to the second reaction zone undergoes in an embodiment of the present disclosure.

Spent catalyst from the first reaction zone fluidized bed 4, in one embodiment is routed to a separator to provide an additional stage of carbon attrition and elutriation as well as hydrocarbon stripping prior to the spent catalyst being routed to the second reaction zone fluidized bed 5. A fluidizing gas 36 may be utilized to fluidize and strip the spent catalyst. Other techniques including mechanical vibration, sonication, ultrasonication, pulsed gas flow and microjet flows may be employed to achieve additional carbon attrition. Recycle hydrogen product gas may be utilized as a stripping gas. Effluent gas from the separator 38 is routed to a solid separator 39, where solids 41 are recovered and effluent gas, with solids removed 40 is available for reuse or discharge, with any additional required emission controls.

Figure 3:
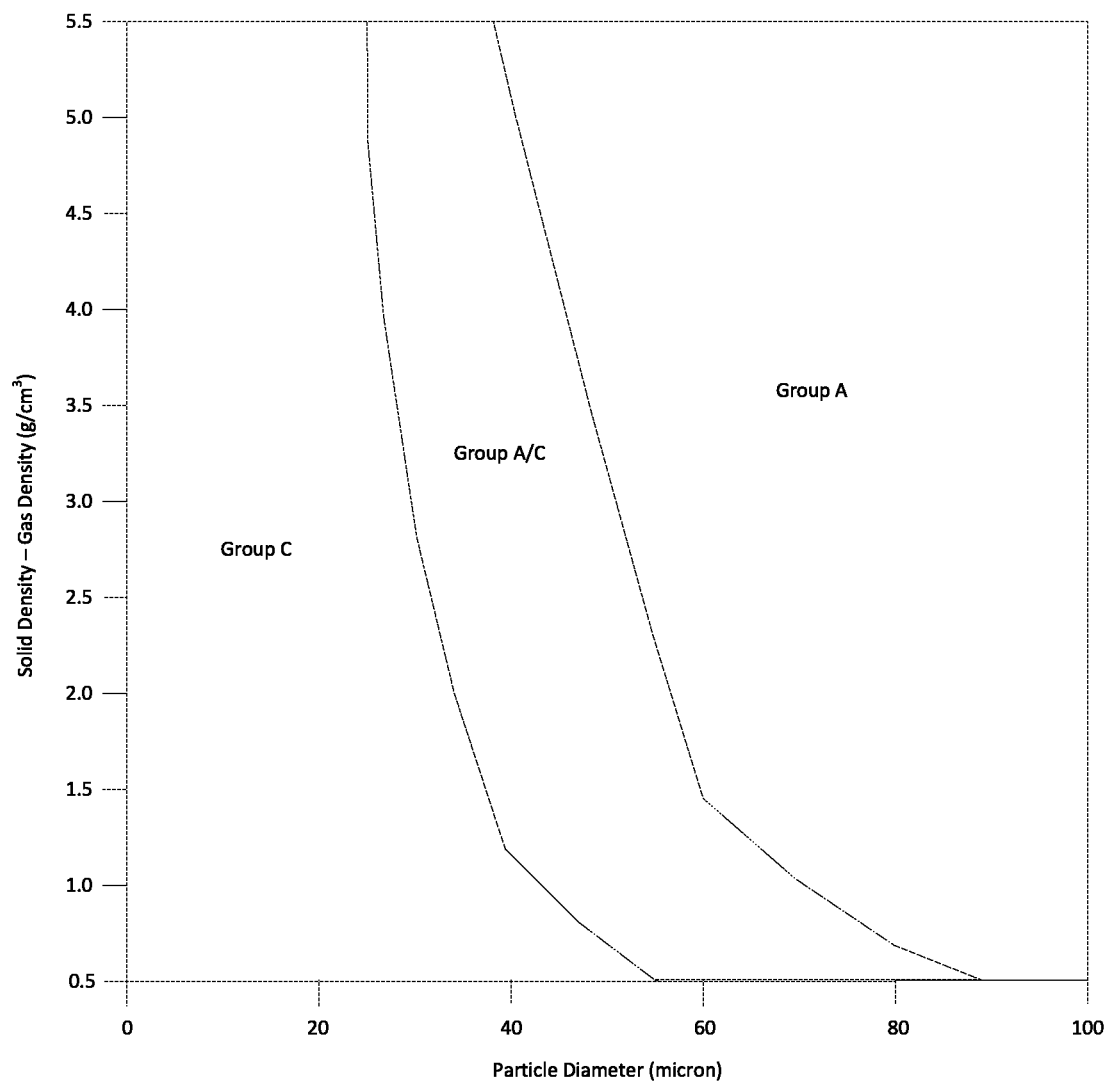
FIG. 3 is a graph which shows the suitable characteristics for a particulate to be defined as a Geldart group C particulate, including the particle size and density.

FIG. 3 is a graph which shows the characteristics for a particulate to be defined as a Geldart group C particulate, including the particle size and density.

What is claimed is:

1. A process for the production of hydrogen and filamentous carbon from the catalytic thermal decomposition of hydrocarbon feedstocks comprising the steps of:
   a) contacting the hydrocarbon feedstock with a catalyst in a fluidized bed of supported transition metal, substantially non-porous, attrition resistant catalyst particles, classified as Geldart Group C (Cohesive) particulates, in a first reaction zone;
   b) attriting the majority of the formed filamentous carbon from the surface of the catalyst particles in the first reaction zone by particle motion in the fluidized bed and by gas injection(s) into the fluidized bed;
   c) separating the attrited filamentous carbon from the effluent gases exiting the first reaction zone;
   d) transferring the catalyst from the first reaction zone into a second reaction zone;
   introducing a fuel and an oxidant into the second reaction zone to heat and regenerate the catalyst via combustion of the fuel and residual carbon on the catalyst surface, in a reduced excess oxygen environment;
   e) returning the regenerated and heated catalyst from the second reaction zone to the first reaction zone;
   whereby, the conversion of the hydrocarbon feedstock is achieved with minimal production of carbon oxides.

2. A process in accordance with claim 1 wherein the catalyst comprises Group VIII transition metal(s) selected from the group nickel, iron and cobalt and an alkaline earth promoter selected from the group consisting of magnesium, calcium and barium on a substantially non-porous (<1% porosity) attrition resistant substrate selected from the group consisting of alumina, silica, silica-alumina and magnesium oxide.

3. A process in accordance with claim 2 wherein the catalyst comprises nickel as active metal, magnesium as a promoter and alpha alumina as a support.

4. A process in accordance with claim 3 wherein the nickel oxide content of the catalyst is less than 10 wt %, and the molar ratio of nickel to magnesium is less than 3 to 1, whereby the low active metal loading and the presence of the magnesium promoter result in high metal-support interaction which reduces the catalyst deactivation rate and reduces nickel contamination in the recovered filamentous carbon product.

5. A process in accordance with claim 3 wherein the alpha alumina porosity is less than 1%.

6. A process in accordance with claim 1 wherein the first reaction zone fluidized bed hydrodynamics, grid design and gas injector(s) design facilitates effective attrition of filamentous carbon from the surface of the catalyst particles throughout the entire fluidized bed and the breakup of particle agglomerates close to the gas injection locations, whereby the recovery of the carbon reaction product from the first reaction zone gaseous effluent stream is maximized without resulting in excessive catalyst attrition.

7. A process in accordance with claim 1 wherein the gaseous effluent from the first reaction zone, with the elutriated filamentous carbon and catalyst fines, is processed in one or more solid separation device(s) selected from the group consisting of gravity separator, cyclone, electrostatic separator, filter or wet scrubber and the first solid separation device may be targeted for recovery of catalyst particles and the recovered catalyst may be returned to the first reaction zone.

8. A process in accordance with claim 7 wherein gaseous effluent from the solid separation device(s) subsequently passes to one or more hydrogen separation device(s) selected from the group consisting of membrane separator and adsorption process and gaseous effluent after hydrogen recovery, including any unconverted hydrocarbons, may be recycled partially or fully back to the first reaction zone to improve the overall conversion of the hydrocarbon feedstock.

9. A process in accordance with claim 1 wherein the second reaction zone comprises a fluidized bed of the regenerating catalyst.

10. A process in accordance with claim 1 wherein the oxidant introduced into the second reaction zone is selected from a group consisting of air, enriched air and oxygen and the oxidant rate to the second reaction zone is controlled to achieve a reduced excess oxygen environment (less than 2 vol % O2 (dry) in the flue gas).

11. A process in accordance with claim 1 wherein the catalyst transfer rate from the first reaction zone to the second reaction zone, and the subsequent return of the heated regenerated catalyst from the second reaction zone back into the first reaction zone, is controlled to minimize catalyst residence time in the second reaction zone, to less than 3 minutes, and to maintain a temperature in the first reaction zone, between 900 and 1650° F.

12. A process in accordance with claim 1 wherein the temperature in the second reaction zone is controlled independently from the temperature in the first reaction zone, by controls comprising primarily of: control of oxidant flow to the second reaction zone; fuel flow control to the second reaction zone and oxidant stream preheat temperature control.

13. A process in accordance with claim 1 wherein the regeneration of the catalyst conducted in the second reaction zone is optimized by controls comprising of: control of oxidant flow and resultant oxygen and carbon monoxide concentration in the gaseous effluent from the second reaction zone; control of the second reaction zone temperature; control of catalyst residence time in the second reaction zone.

14. A process in accordance with claim 1 wherein some portion of the hydrogen product is split off and used as a zero carbon oxide emitting gaseous fuel in the second reaction zone.

15. A process in accordance with claim 1 wherein the catalyst transferred from the first reaction zone, to the second reaction zone, undergoes an additional processing step consisting of additional carbon attrition and residual hydrocarbon stripping, prior to the catalyst entering the second reaction zone, achieved by processing steps selected from the group consisting of fluidization, gas stripping, mechanical vibration, sonication, ultrasonication, pulsed gas flow and microjet flows.

16. A process in accordance with claim 1 wherein fluidization of the nano- and/or micron-sized catalyst particles and agglomerates in the first reaction zone may be enhanced by fluidization enhancement techniques selected from the group consisting of mechanical vibration, mechanical stirring, sonication, ultrasonication, pulsed gas flow, electrical fields, magnetic fields, particle size mixing, addition of fluidization aids and microjet flows.

17. A process in accordance with claim 1 wherein fluidization of the nano- and/or micron-sized catalyst particles and agglomerates in the second reaction zone may be enhanced by fluidization enhancement techniques selected from the group consisting of mechanical vibration, mechanical stirring, sonication, ultrasonication, pulsed gas flow, electrical fields, magnetic fields, particle size mixing, addition of fluidization aids and microjet flows.

18. A process in accordance with claim 1 wherein the average activity and the holdup of the catalyst in the first reaction zone can be controlled by addition of fresh catalyst to the process.

19. A process in accordance with claim 1 wherein the separation of filamentous carbon from catalyst particles can be enhanced by magnetic separation techniques and separated catalyst particles may be returned to the process.

20. A process in accordance with claim 1 wherein the imposition of magnetic field(s) may be utilized to polarize catalyst particles and result in catalyst particle agglomeration resulting in enhanced solids separation from the effluent gases leaving the first and second reaction zones.

21. A process in accordance with claim 1 wherein additional heat can be provided to the first reaction zone by inclusion of heating surfaces imbedded in the first reaction zone fluidized bed.

22. A process in accordance with claim 1 wherein additional air, enriched air and/or oxygen may be injected into the first reaction zone fluidized bed, resulting in partial oxidation of some portion of the hydrocarbon feedstock, hydrogen product or carbon byproduct, thereby supplementing some portion of the required heat transfer to the first reaction zone otherwise provided by return of heated and regenerated catalyst from the second reaction zone or by the heating surfaces embedded in the first reaction zone fluidized bed.

23. A process in accordance with claim 1 wherein one or more hydrogen permeable membrane element(s) may be installed in the first reaction zone in order to selectively permeate hydrogen from the reactor and shift the reaction equilibrium towards increased hydrocarbon conversion.

* * * * *